United States Patent [19]

Chamay et al.

[11] 3,779,010
[45] Dec. 18, 1973

[54] COMBINED THRUST REVERSING AND THROAT VARYING MECHANISM FOR A GAS TURBINE ENGINE

[75] Inventors: Anthony Joseph Chamay, Marblehead; Richard Paul Johnston, Peabody, both of Mass.

[73] Assignee: General Electric Company, Lynn, Mass.

[22] Filed: Aug. 17, 1972

[21] Appl. No.: 281,478

[52] U.S. Cl............. 60/226 A, 60/263, 239/265.31
[51] Int. Cl.............................................. F02k 3/04
[58] Field of Search.............. 60/226 A, 226 R, 60/229, 263; 239/265.13, 265.25, 265.27, 265.29, 265.31, 265.33

[56] References Cited
UNITED STATES PATENTS

| | | |
|---|---|---|
| 3,032,981 | 5/1962 | Lawler.......................... 239/265.13 |
| 3,112,616 | 12/1963 | Adamson et al..................... 60/229 |
| 3,262,270 | 7/1966 | Beavers............................. 60/226 A |
| 2,865,169 | 12/1958 | Hausmann................. 239/265.13 X |

Primary Examiner—Carlton R. Croyle
Assistant Examiner—Robert E. Garrett
Attorney—Edward S. Roman et al.

[57] ABSTRACT

A thrust reversing mechanism for reversing the flow through either the exhaust nozzle or fan duct of a jet propulsion powerplant is further modified to include apparatus for varying the throat area of the exhaust nozzle or fan duct as a means of optimizing powerplant efficiency throughout its operating range.

7 Claims, 6 Drawing Figures

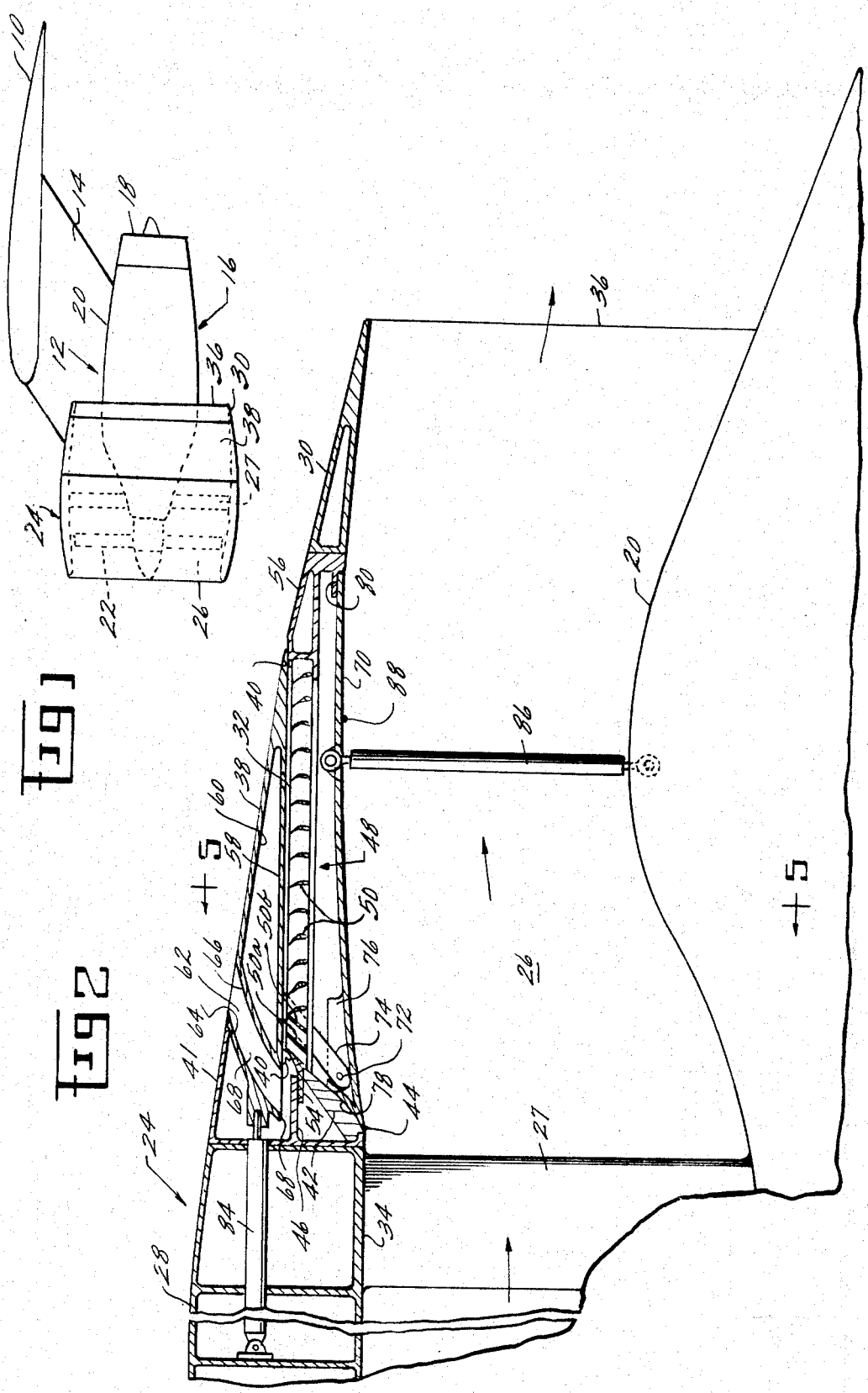

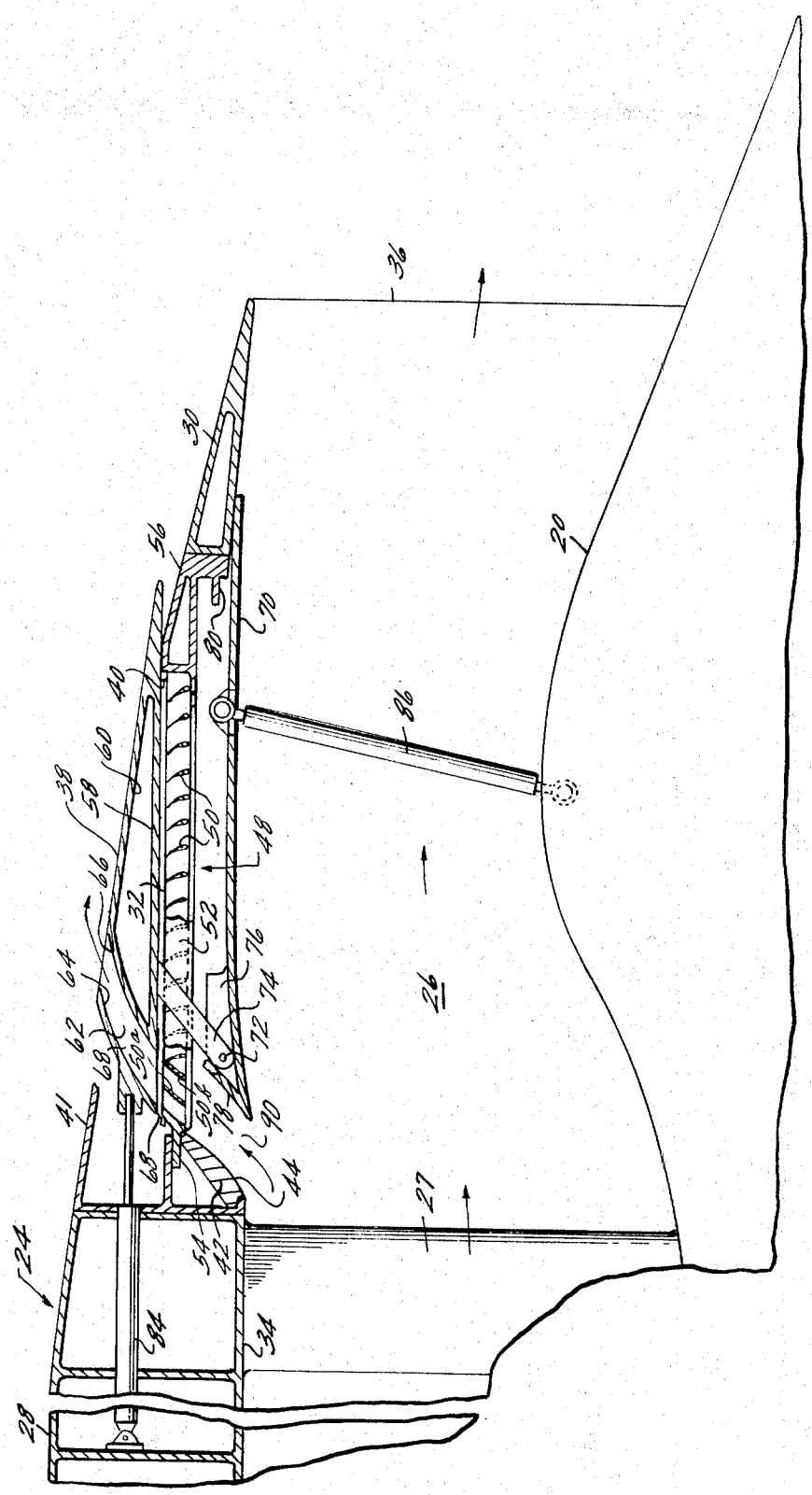

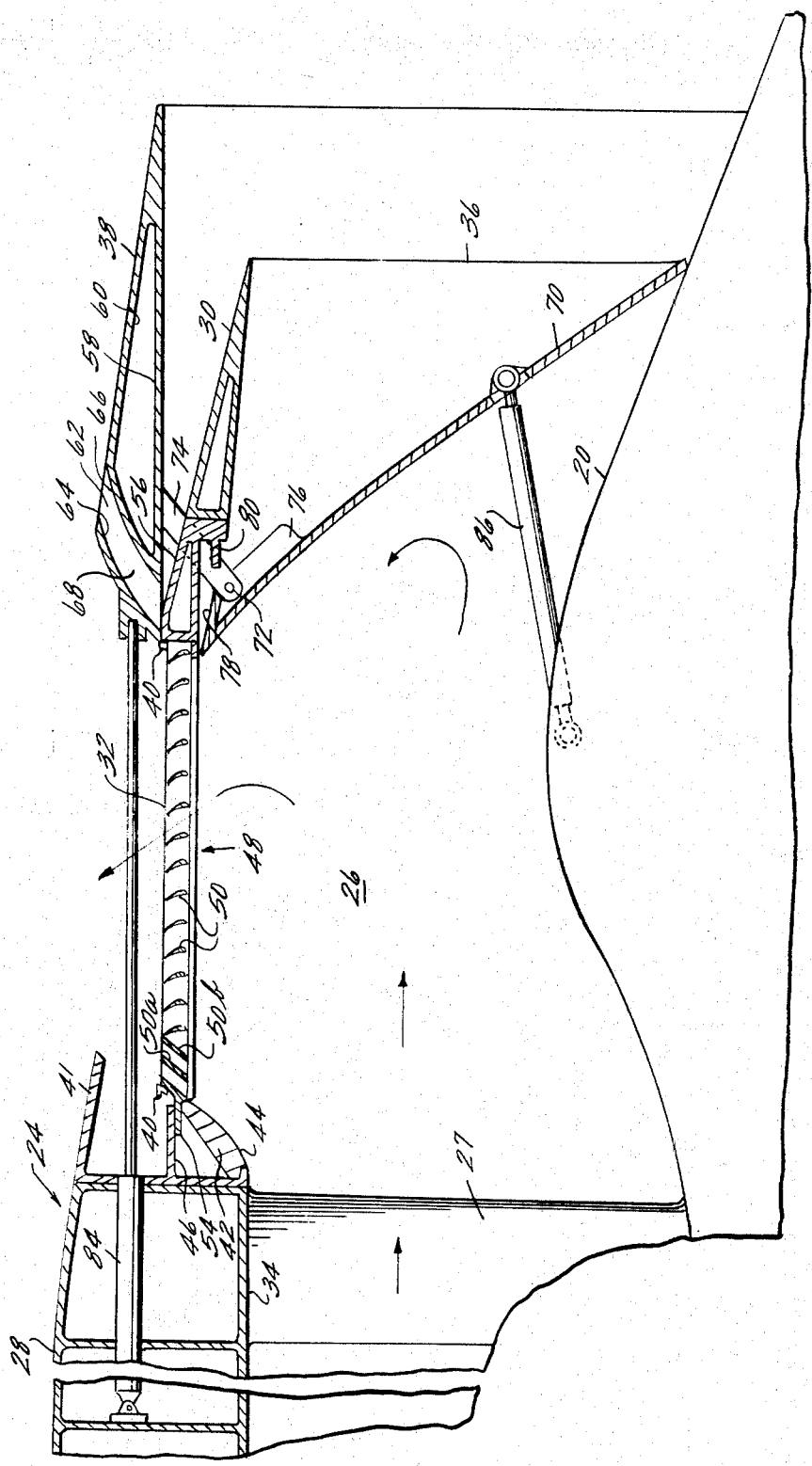

COMBINED THRUST REVERSING AND THROAT VARYING MECHANISM FOR A GAS TURBINE ENGINE

BACKGROUND OF THE INVENTION

In general, this invention relates to a combined thrust reversing and throat varying mechanism for a gas turbine engine and more particularly to an apparatus having the combined capability of reversing thrust and varying effective nozzle throat area through either the exhaust nozzle of a gas turbine engine or the fan cowling of a turbofan engine.

With the advent of the fan engine, whether forward or aft fan, it has become necessary to supply a thrust reverser mechanism to reverse the fluid flow through the generally annular cross-section of the bypass duct. Engines designed to accommodate a large quantity of the propulsive fluid through the annular bypass duct are generally called high bypass ratio turbofans wherein the bypass ratio may be up to eight to one or more. In such engines, it may be necessary to reverse only the bypass flow which may be sufficient by itself to obtain the reversing action required to meet specifications.

To this end, reversing structures of lightweight and straight-forward, simple construction have been provided as disclosed in detail in U.S. Pat. Nos. 3,262,270 and 3,262,271 to Beavers and of common assignment to the instant assignee.

Reversing structures of this type, however, fail to provide for a variable nozzle throat area capability which may be essential in order to meet today's conflicting requirements for efficient performance at cruise altitude and low noise during takeoff. A constant throat area type nozzle must be designed for a throat area which is a compromise between the area ideally suited for takeoff and the area ideally suited for high altitude cruise. Hence, the constant throat area type of nozzle is generally undersized for optimum efficiency during takeoff and oversized for optimum efficiency during high altitude cruise.

Therefore it is a primary object of this invention to provide a thrust reversing mechanism for a gas turbine engine which additionally includes a simple means for varying the effective nozzle throat area of either the exhaust nozzle or the fan cowling.

It is also an object of this invention to combine a thrust reversing mechanism with a nozzle throat varying mechanism for a gas turbine engine wherein the combined mechanism remains simple, compact, and lightweight.

SUMMARY OF THE INVENTION

To this end, a jet propulsion powerplant is provided with a mechanism for both reversing thrust and varying the effective nozzle throat area. A cowling generally surrounds an inner casing or plug and is spaced form the casing or plug to form a flow receiving duct. The cowling includes a forward portion and a translatable portion with the upstream end of the translatable portion including a generally annular passageway therethrough for receiving a portion of the flow from the duct in order to vary the effective nozzle throat area of the duct. A fixed ring of flow reversing cascades is disposed downstream of the fixed cowling portion wherein the upstream end of the cascades is adapted to direct flow to the annular passageway without reversing flow direction. Actuating means are disposed within the cowling in connection to the translatable portion in order to effect translation thereof. The upstream ends of a plurality of peripherally disposed blocker flaps are adapted for simultaneous rotation and translation with respect to the translatable cowling portion. The flaps may be completely retracted during the normal cruise condition to form part of the inner flow surface of the duct under the cascades thereby blocking flow through the cascades to the annular passageway. Link means connect to the flaps and the casing for guiding the flaps into duct blocking position for reversing the duct flow.

DESCRIPTION OF THE DRAWINGS

While the specification concludes with a series of claims which particularly point out and distinctly claim the subject matter which Applicant regards as his invention, a complete understanding of the invention will be gained from the following description of a preferred embodiment. This description is given in connection with the accompanying drawings in which:

FIG. 1 is a side view of a typical front fan powerplant supported from an aircraft wing and employing the instant invention.

FIG. 2 is an enlarged partial cross-sectional view in the area of the fan duct showing the combined nozzle throat area varying mechanism and reverser mechanism in the cruise position.

FIG. 3 is an enlarged partial cross-sectional view showing the combined nozzle throat area varying mechanism and reverser mechanism of FIG. 2 as actuated to the position having the largest effective nozzle throat area.

FIG. 4 is an enlarged partial cross-sectional view showing the combined nozzle throat area varying mechanism and reverser mechanism of FIG. 2 as actuated to the reversing position.

DESCRIPTION OF THE PREFERRED EMBODIMENT

Figure 5:
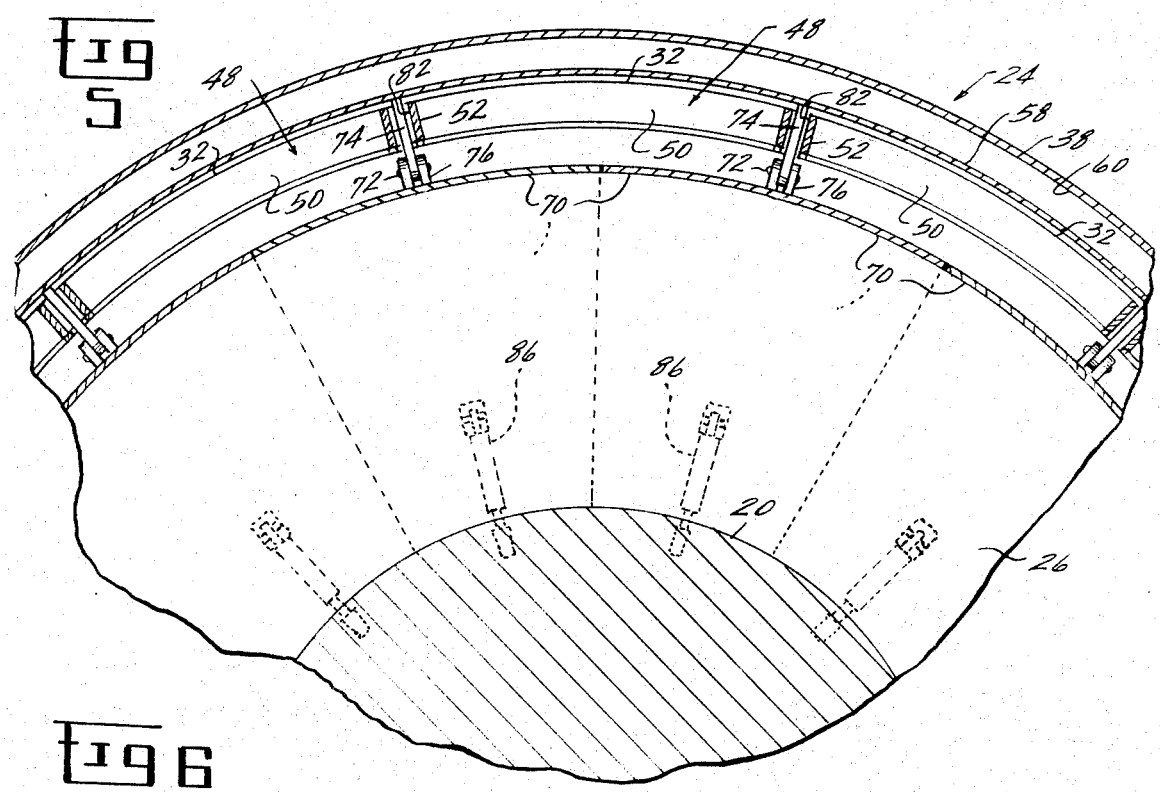
FIG. 5 is a partial cross-sectional view taken along the line 5—5 of FIG. 2.

It should be understood that although the invention is described in relation to a front fan high bypass ratio powerplant, it is equally applicable to all types of fan powerplants regardless of bypass ratio. Also, it will become obvious that the invention is not limited to fan ducts, but may be applied to the exhaust nozzle of any type of gas turbine engine including a turbofan engine. The invention is described in connection with a front fan powerplant with a concentric jet engine, wherein the fan cowling does not extend completely back to the rear of the jet engine wall although the invention is equally applicable to such an installation. High bypass ratio fans are those in which the ratio of the fluid passing through the fan to the jet engine may be as high as eight to one or above. In such installations it may be necessary to reverse only the fan flow for satisfactory performance and the jet engine exhaust may be ignored.

Referring first to FIG. 1, there is shown a front fan powerplant of the general type that might employ the instant invention. To this end, an aircraft structure such as wing 10 may support an engine generally indicated at 12 by means of a conventional strut or pylon structure 14. The engine 12 may be of the front fan concentric type as shown in FIG. 1 which employs an engine 16 discharging through a nozzle 18 to provide thrust. The jet engine is enclosed within a casing 20 in the conventional manner and includes in serial flow relationship a compressor, (not shown) combustor, (not shown) first turbine means (not shown) for driving the compressor, and second turbine means (not shown) for driving a fan 22. While described in connection with a concentric fan jet engine, it should be noted that casing 20 may also act as a plug in an exhaust nozzle fed from a gas generator in a well known manner. For convenience of description, the concentric arrangement will be described.

In order to provide additional thrust in the well known manner, the fan 22 concentric with the engine and extending radially beyond the casing 20 is provided. The fan 22 is surrounded by cowling 24 which is larger in diameter than the engine and spaced from the engine casing 20 to form a bypass duct 26 for additional thrust by movement of relatively large masses of low velocity air in the well known manner. As explained above, in the high bypass ratio type powerplant this mass of air may be as high as 8 or greater times the amount of air flow through the engine 16. The fan air is thus used to propel fluid through the duct 26 as well as to supercharge the engine 16.

In order to provide a simplified and light-weight reverser for the fan structure and bypass flow, it is advantageous to make use of the cowling 24 as part of the reverser mechanism. At the same time, it is also desired that cowling 24 be kept as thin as possible for desired aerodynamic reasons. Referring now to FIGS. 2 through 4, it will be seen that the cowling 24 includes a forward fixed portion 28 and an aft fixed portion 30, both of which are normally cylindrical. The actual spacing of portions 28 and 30 provides an opening 32 between the portions for a purpose to be described. In order to provide an aerodynamically smooth cowling structure in cruise position, the forward cowling portion 28 in conjunction with inner surface 34 forms a flow surface and the aft fixed portion 30 itself provides both inner and outer flow surfaces as shown. Conveniently, the aft end of fixed portion 30 may form the throat 36 of a convergent nozzle with casing 20.

In order to provide access to opening 32 through which air flow will pass during reverse thrust, there is provided a translatable intermediate cowling portion 38 of suitable axial length which may conveniently be of hollow, thin skinned structure for light-weight and formation of smooth flow surfaces. In the closed position shown in FIG. 2, intermediate portion 38 forms a smooth continuous flow surface with the forward and aft fixed portions 28 and 30 respectively. Sealing means 40 may be supplied at each end of the opening in any suitable manner and conveniently may be designed to be squeezed between the portions during cruise operation as is apparent in FIG. 2.

The forward fixed portion 28 of cowling 24 includes an integral flange 41 which is in the form of a rearwardly extending annulus providing an aerodynamically smooth and uniform outer surface. An intermediate fixed flange 46 extending rearwardly from the forward fixed portion 28 of cowling 24 is provided for structural support and also connects to a cone member 42. The interior surface 44 of cone member 42 flares radially outward in a gradual manner for reasons which will be made obvious from the subsequent discussion. The whole outer cowling 24 is supported from the central engine or casing 20 through struts 27 as appropriate.

Disposed within the opening 32 is a cascade shown generally at 48 comprising a plurality of axially spaced apart arcuate fins 50. The arcuate fins 50 of cascade 48 are maintained between a plurality of peripherally spaced beam support members 52, as best viewed in FIG. 5, which extend aft in a finger-like fashion. To provide stiffness and to form a box-like structure with the beams, there is provided a forward ring member 54 joining the upstream ends of the beams with cone member 42 and flange 46. The downstream ends of the beam support members 52 are joined by a plurality of arcuate members arranged in circumferential spaced apart relation to form a segmented aft ring member 56. This arrangement provides a series of rectangular openings, or box-like structure. Into the openings of this box-like structure, the plurality of arcuate fins 50 are suitably fastened to provide an overall rigid and light-weight cascade construction. Any damaged fins in this lattice work or a desire for a different orientation is easily handled by replacing the individual fins 50, as will be apparent. Attaching the fins to the beams 52 by suitable bolts (not shown) provides for easy replacement. Upstream fins 50a, 50b are oriented in opposing directions to the remainder of the cascade fins 50 for reasons which will be made apparent from the following discussion.

When thrust reversal is not desired, it is necessary that the intermediate cowling 38 be telescoped over cascades 48 so that the cascades are covered or completely surrounded by the intermediate cowl in the cruise position as shown in FIG. 2. To this end, intermediate cowl 38 is formed with an inner circumferential wall 58 and an outer circumferential wall 60. This dual construction permits the use of very light-weight metal such that the inner wall 58 may ride on the outer surface of beam support members 52. In other words, the beams and the inner wall 58 cooperate to form a sliding track to telescope the intermediate cowling 38 over the cascades 48.

The upstream end of the intermediate cowling 38 includes an annular passageway 62 for gradually turning the flow therethrough from a generally radial direction toward a generally rearward direction. Passageway 62 is defined by two bowed conical wall members 64, 66 maintained in axially spaced relation by peripherally spaced apart thin rib members 68.

In order to reverse the flow through duct 26, it is first necessary to provide a means of blocking the flow therethrough. To this end, there is provided a plurality of peripherally disposed blocker flaps 70 of isosceles trapezoid shape as best shown in FIG. 5. Each blocker flap 70 is pivotally connected at its upstream end to a bracket 74 which extends radially inward from the cowling 38. Blocker flaps 70 nest within the cowling to form part of the inner flow surface in the cruise position as shown in FIG. 2. The upstream end of each blocker flap 70 is folded over to form an outwardly flared surface 78 which closely engages the inner surface 44 of cone 42. Extending rearward from the fold there is provided a rib member 76 to which the bracket 74 is rotatably connected at pivot 72. In order to store flaps 70, they are designed to be retractably nested in a recess 80 to form a smooth inner wall surface in the cruise position. It will be apparent that the flaps 70 may be quite thin and thus easily actuated to form the smooth flow surface necessary in the cruise position.

Brackets 74 extend radially inward through cascade 48 from fixed connection to the intermediate cowling portion 38. To this end peripherally spaced apart longitudinal guideways 82, as best seen in FIG. 5, are provided between adjacent beam support members 52. The guideways 82 coincide with circumferential spaces (not shown) between the segments of the aft ring member 56 to provide for unobstructed axial translation of the brackets 74 along the length of the cowling to the extreme aft position shown in FIG. 4.

To move the translatable intermediate cowling portion 38 together with the blocker flaps 70, there is provided a suitable arrangement including an actuating member 84 that is connected to the forward fixed portion 28 of cowling 24. The actuating member may be electrical, pneumatic or any well known device which is adequate to translate the intermediate cowling portion 38 aft and uncover the cascades 48.

In order to reduce the heavy duty actuating structure that may be required, due to high loads on the blocker flaps 70 when they are in blocking position as shown in FIG. 4, there is provided a link 86 connected to each flap and casing 20. Each link 86 operates to pull a corresponding flap inward, into substantial edge abutment and end abutment on casing 20, upon translation of actuating member 84. Links 86 may be suitably streamlined to present minimum aerodynamic drag during the cruise operation of FIG. 2. In order to reduce the loads and provide some balancing, the links 86 are preferably pivotally connected near and upstream of the center of pressure 88 of each flap. This reduces the horizontal force component in the downstream direction that is applied to actuating member 84, so that the heavy blocker door loads pass through link 86 into the casing 20 of engine 12 where they are readily sustained.

Between the cruise position of FIG. 2 and the thrust reversing position of FIG. 4, there is provided a third intermediate position shown in FIG. 3 for providing an increased effective nozzle throat area during high engine power settings such as at takeoff and landing approach. The increased nozzle throat area is required at the high power settings in order to insure maximum engine efficiency.

The nozzle throat area may be increased when desired by operating the actuating member 84 to translate the intermediate cowling 38 a short distance aft from the cruise position of FIG. 2. As is readily obvious from FIG. 3, the intermediate position is arrived at when the passageway 62 substantially aligns to receive air flow from the upstream fins 50a, 50b. Blocker flaps 70 also simultaneously translate rearwardly with intermediate cowling 38 so as to open up a passageway 90 between cone member 42 and flared surface 78. Passageway 90 is in flow communication with bypass duct 26, and receives a portion of the airflow through bypass duct 26 thereby increasing the effective nozzle throat area of the duct. Upstream fins 50a and 50b are oriented to provide for smooth and uniform airflow from passageway 90 to passageway 62 in the intermediate cowling. Whereas the airflow through the passageways 62 and 90 must be gradually turned from a generally radial direction to a generally rearward direction, the need for orienting the upstream fins of cascade 48 in a direction different from the orientation of the remaining fins is made obvious.

Although only two upstream fins 50a, 50b have been shown as oriented to direct air flow in a rearward direction, it is readily understood that more or less fins may be so oriented depending upon the degree of variation to effective nozzle throat area required.

Alternatively the upstream fins could be eliminated entirely with direct uninterrupted flow communication through the forward portion of the cascade. Also it will be appreciated that positions between those shown in FIGS. 2 and 3 can be achieved so as to modulate the effective nozzle throat area.

Figure 6:
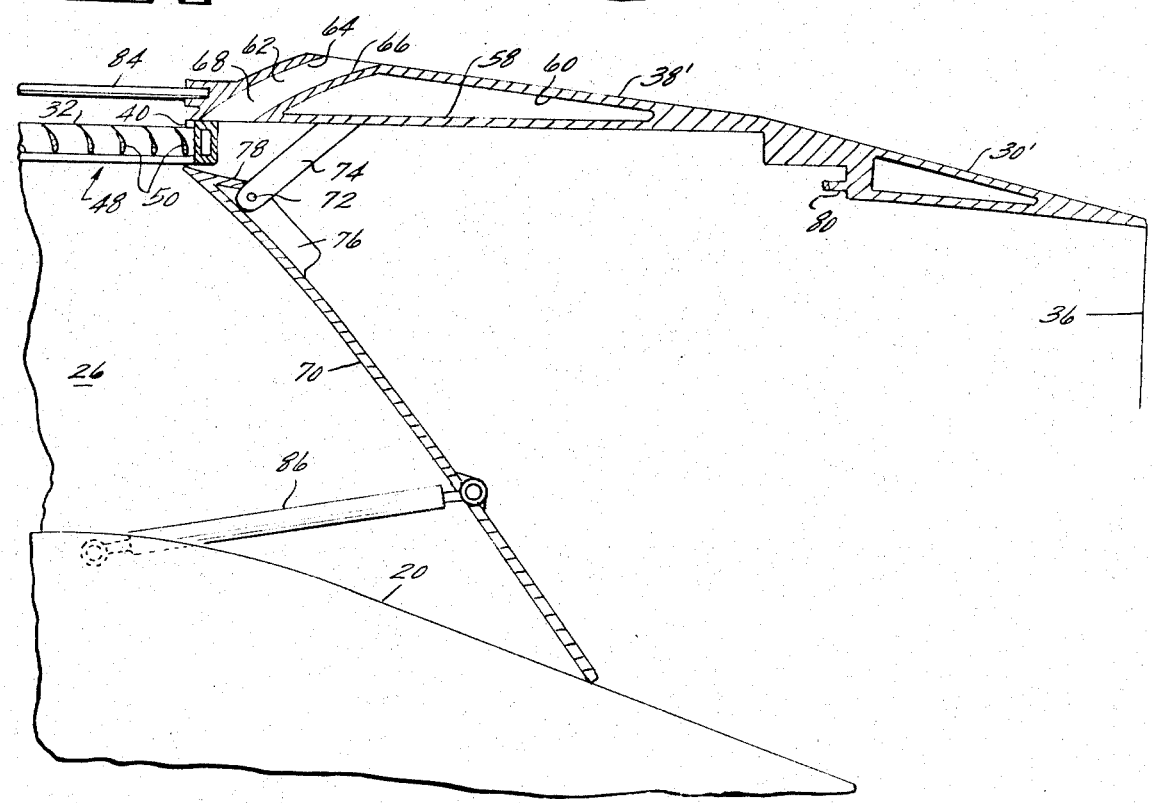
FIG. 6 is an enlarged partial cross-sectional view showing an alternate arrangement for the combined nozzle throat area varying mechanism and reverser mechanism of FIG. 2 as actuated to the reversing position.

Referring now to FIG. 6 where like numerals designate previously described elements, there is shown an alternate arrangement whereby the aft cowling portion 30' is affixed to the intermediate cowling portion 38' and made to translate therewith.

Having described preferred embodiments of the invention, though not exhaustive of all possible equivalents, what is desired to be secured by Letters Patent is distinctly claimed and particularly pointed out in the claims appearing below.

What is claimed is:

1. In a jet propulsion powerplant a mechanism for reversing thrust and varying effective nozzle throat area comprises:

a cowling surrounding and spaced apart from an inner casing to form a flow receiving duct therebetween wherein the cowling has a fixed forward portion and a translatable portion with the upstream end of the translatable portion having a generally annular passageway therethrough for receiving a portion of the flow from the duct in order to vary the effective nozzle throat area of the duct;

a fixed ring of flow reversing cascades disposed downstream of the fixed cowling portion wherein the upstream end of the cascades is adapted to direct flow to the annular passageway without reversing flow direction;

actuating means disposed within the cowling and connected to the translatable portion to effect translation thereof;

a plurality of peripherally disposed blocker flaps, the upstream ends of which are adapted for simultaneous rotation and translation with respect to the translatable cowling portion, wherein the flaps may be completely retracted during the normal cruise condition to form part of the inner flow surface of the duct under the cascades thereby blocking flow through the cascades to the annular passageway; and link means connected to the flaps and the wall for guiding the flaps into duct blocking position for reversing the duct flow.

2. The apparatus of claim 1 wherein the cowling includes a fixed aft portion spaced apart from the fixed forward portion to define an opening therebetween for receipt of the cascades, and wherein the translatable portion provides an intermediate cowling to cover the opening.

3. The apparatus of claim 1 wherein:

the cascades comprise a plurality of spaced apart arcuate fins maintained between a plurality of spaced peripherally spaced beam support members extending aft in a finger-like fashion and connected forward and aft by ring members; and the blocker flaps are adapted for simultaneous rotation and translation with respect to the translatable cowling portion by pivotal connection to brackets extending radially inward from the translatable portion through guideways in the cascade which are defined by spaced apart beam members.

4. The apparatus of claim 1 wherein:

the upstream end of each flap is folded over for engagement during the cruise condition with an outwardly flared interior surface of the forward cowling portion such that upon initial translation of the translatable cowling portion, the fold separates from the flared interior surface to define a passageway in communication with the duct for diverting a portion of the flow from the duct through the upstream end of the cascade to the annular passageway.

5. The apparatus of claim 1 wherein the translatable cowling comprises:

inner and outer circumferential walls converging in an aft direction; and two generally bowed conical wall members maintained in axially spaced relation to define the annular passageway therethrough wherein the aft conical wall member is peripherally joined to the inner and outer circumferential walls.

6. The apparatus of claim 1 wherein strut means is provided connected to the casing upstream of the flaps for support of the cowling and transmission of thrust reverse loads through the cowling to the inner wall;

7. The apparatus of claim 1 wherein the jet propulsion powerplant is of the fan type having a fan concentric to the inner wall and extending beyond the inner wall and the cowling and inner wall define a bypass duct for receiving fan flow.

* * * * *